(12) United States Patent
Okayama et al.

(10) Patent No.: US 9,619,566 B2
(45) Date of Patent: Apr. 11, 2017

(54) INFORMATION PROCESSION APPARATUS, INFORMATION PROCESSING METHOD, PROGRAM, HISTORY MANAGEMENT SERVER, HISTORY MANAGEMENT METHOD, AND INFORMATION PROCESSING SYSTEM

(75) Inventors: Takahiro Okayama, Tokyo (JP); Yuya Aoki, Tokyo (JP); Mitsuru Nishibe, Tokyo (JP); Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 13/434,225

(22) Filed: Mar. 29, 2012

(65) Prior Publication Data

US 2012/0256887 A1 Oct. 11, 2012

(30) Foreign Application Priority Data

Apr. 6, 2011 (JP) ................................ 2011-084649

(51) Int. Cl.
*G06F 17/00* (2006.01)
*G06F 17/30* (2006.01)

(52) U.S. Cl.
CPC .. *G06F 17/30867* (2013.01); *G06F 17/30693* (2013.01)

(58) Field of Classification Search
CPC .................... G06F 17/30864; G06F 17/30867
See application file for complete search history.

(56) References Cited

U.S. PATENT DOCUMENTS

| 7,685,191 | B1* | 3/2010 | Zwicky | ............. | G06F 17/30867 707/706 |
| 2006/0287985 | A1* | 12/2006 | Castro et al. | ..................... | 707/3 |
| 2007/0226183 | A1* | 9/2007 | Hart | .................. | G06F 17/30699 |

FOREIGN PATENT DOCUMENTS

JP 2007-219615 8/2007

\* cited by examiner

*Primary Examiner* — Keith Bloomquist
(74) *Attorney, Agent, or Firm* — Paratus Law Group, PLLC

(57) ABSTRACT

Provided is an information processing apparatus including a selected information acquisition unit for acquiring, from a history management server managing, for each search string, one or more pieces of selected information selected from one or more pieces of page identification information obtained by using the search string, selected information matching a selected string, and a display control unit for performing control such that information regarding a page identified by the selected information acquired by the selected information acquisition unit is displayed.

19 Claims, 12 Drawing Sheets

FIG.5

| SEARCH STRING |
|---|
| patent |
| Corporation |
| STUV Corporation |
| Camera |

261

| URL | NUMBER OF TIMES OF SELECTION | STAY TIME |
|---|---|---|
| http://www.stuv.com/ | 151 | 70min |
| http://www.stuv.co.jp/ | 209 | 104min |
| http://www.stuv.jp/ | 572 | 580min |
| http://www.jp.stuvstyle.com/ | 410 | 529min |
| http://www.stuv.jp/support/ | 82 | 50min |
| http://en.widia.org/wi/STUV | 77 | 41min |
| http://ja.widia.org/wi/STUV | 112 | 134min |

INFORMATION PROCESSION APPARATUS, INFORMATION PROCESSING METHOD, PROGRAM, HISTORY MANAGEMENT SERVER, HISTORY MANAGEMENT METHOD, AND INFORMATION PROCESSING SYSTEM

BACKGROUND

The present disclosure relates to an information processing apparatus, an information processing method, a program, a history management server, a history management method, and an information processing system.

In recent years, with the spread of the Internet, users are enabled to search with ease for pages related to a specified string on the Internet by using their own PCs (Personal Computer) or the like. Various technologies are disclosed as the technology for searching, on the Internet, for a page related to a string specified by a user (for example, see 2007-219615A). A user is assumed to specify various strings as the string used for a search, and, for example, when there is an unfamiliar term in a page that is currently being viewed or there is a term desired to be further looked up, a user is assumed to specify the term as the string used for a search.

When a search is performed using a string specified in this manner, a page acquired by the search is expected to include an explanation on the term, and the user can grasp the meaning of the term by viewing this explanation.

SUMMARY

However, no method is disclosed of reducing, at the time of a user performing a search using a string present on a page, the burden such as an operation of inputting the string, the operation of starting a search or the like. Thus, a method is desired of reducing the burden arising when performing a search using a string present on a page.

According to the present disclosure, there is provided an information processing apparatus which includes a selected information acquisition unit for acquiring, from a history management server managing, for each search string, one or more pieces of selected information selected from one or more pieces of page identification information obtained by using the search string, selected information matching a selected string, and a display control unit for performing control such that information regarding a page identified by the selected information acquired by the selected information acquisition unit is displayed.

Furthermore, according to the present disclosure, there is provided an information processing apparatus which includes a page identification information acquisition unit for acquiring, from a search server, one or more pieces of page identification information matching a search string, a page selection unit for selecting page identification information from the one or more pieces of page identification information acquired by the page identification information acquisition unit, and a transmission control unit for performing control such that the search string and the page identification information selected by the page selection unit are transmitted to a history management server.

Furthermore, according to the present disclosure, there is provided a history management server which includes a storage unit storing, for each search string, one or more pieces of selected information selected from one or more pieces of page identification information obtained by using the search string, a selected information acquisition unit for acquiring, from the storage unit, selected information matching a selected string acquired from an information processing apparatus, and a transmission control unit for performing control such that the selected information acquired by the selected information acquisition unit is transmitted to the information processing apparatus.

Furthermore, according to the present disclosure, there is provided an information processing system which includes a history management server including a storage unit storing, for each search string, one or more pieces of selected information selected from one or more pieces of page identification information obtained by using the search string, a selected information acquisition unit for acquiring, from the storage unit, selected information matching a selected string, and a transmission control unit for performing control such that the selected information acquired by the selected information acquisition unit is transmitted, and an information processing apparatus including a selected information acquisition unit for acquiring the selected information from the history management server, and a display control unit for performing control such that information regarding a page identified by the selected information acquired by the selected information acquisition unit is displayed.

According to the present disclosure, the burden arising when performing a search using a string present on a page can be reduced.

BRIEF DESCRIPTION OF THE DRAWINGS

FIG. 5 is a diagram showing an example structure of history information managed by the history management server according to the embodiment;

DETAILED DESCRIPTION OF THE EMBODIMENT(S)

Figure 1:
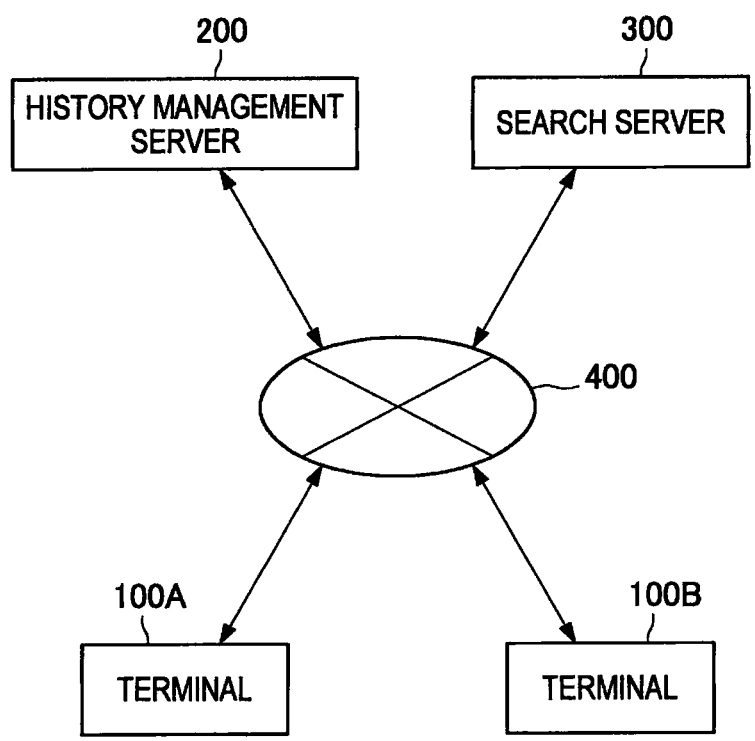
FIG. 1 is a diagram showing a configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as terminals 100A and 100B. However, if it is not particularly necessary to distinguish each of a plurality of structural elements having substantially the same functional configuration, only the same reference numeral is assigned. For example, if it is not particularly necessary to distinguish between the terminals 100A and 100B, they are simply referred to as the terminal(s) 100.

Additionally, an explanation will be given in the following order.
1. Embodiment
1.1. Configuration of Information Processing System
1.2. Function of First Terminal
1.3. Function of History Management Server
1.4. Function of Second Terminal
1.5. Operation of Information Processing System
1.6. Hardware Configuration of Information Processing Apparatus
2. Summary 1. Embodiment 1.1. Configuration of Information Processing System First, a configuration of an information processing system according to an embodiment of the present disclosure will be described with reference to FIG. 1. As shown in FIG. 1, an information processing system 10 according to an embodiment of the present disclosure includes terminals 100A and 100B, a history management server 200, and a search server 300. The terminals 100A and 100B, the history management server 200, and the search server 300 are capable of communication via a network 400. Additionally, the number of the terminals 100, the history management servers 200, and the search servers 300 is not particularly limited.

The terminal 100A is a terminal used by a user A, for example. The terminal 100A transmits a string used for a search (hereinafter, also referred to as a "search string") to the search server 300, and acquires a search result from the search server 300, for example. The search result is formed from one or more pieces of page identification information. The terminal 100A selects a piece of page identification information from the search result, and acquires a page identified by the selected page identification information. The page identification information selected by the terminal 100A (hereinafter, also referred to as the "selected information") and the search string are transmitted to the history management server 200 as history information.

The page may be a document written in an HTML (HyperText Markup Language) format, or it may be text data, for example. In a case the Internet is used as the network 400, a Web page may be used as the page, for example. Also, as the page identification information, an URL (Uniform Resource Locator) of the page can be used, for example.

The search server 300 is a server capable of searching for a page based on a string acquired from the terminal 100A and returning page identification information acquired by the search to the terminal 100A. The history management server 200 is a server capable of managing history information transmitted from the terminal 100A. Also, when a string selected by the terminal 100B (hereinafter, also referred to as the "selected string") is received, the history management server 200 acquires selected information matching the selected string from the history information, and returns the acquired selected information to the terminal 100B.

The terminal 100B is a terminal used by a user B, for example. The terminal 100B transmits a selected string to the history management server 200, and acquires selected information matching the selected string from the history management server 200. The terminal 100B performs control such that information regarding a page identified by the acquired selected information is displayed. Here, an explanation is given assuming that the user A and the user B are different users, but the user A and the user B may be the same user.

1.2. Function of First Terminal

Figure 2:
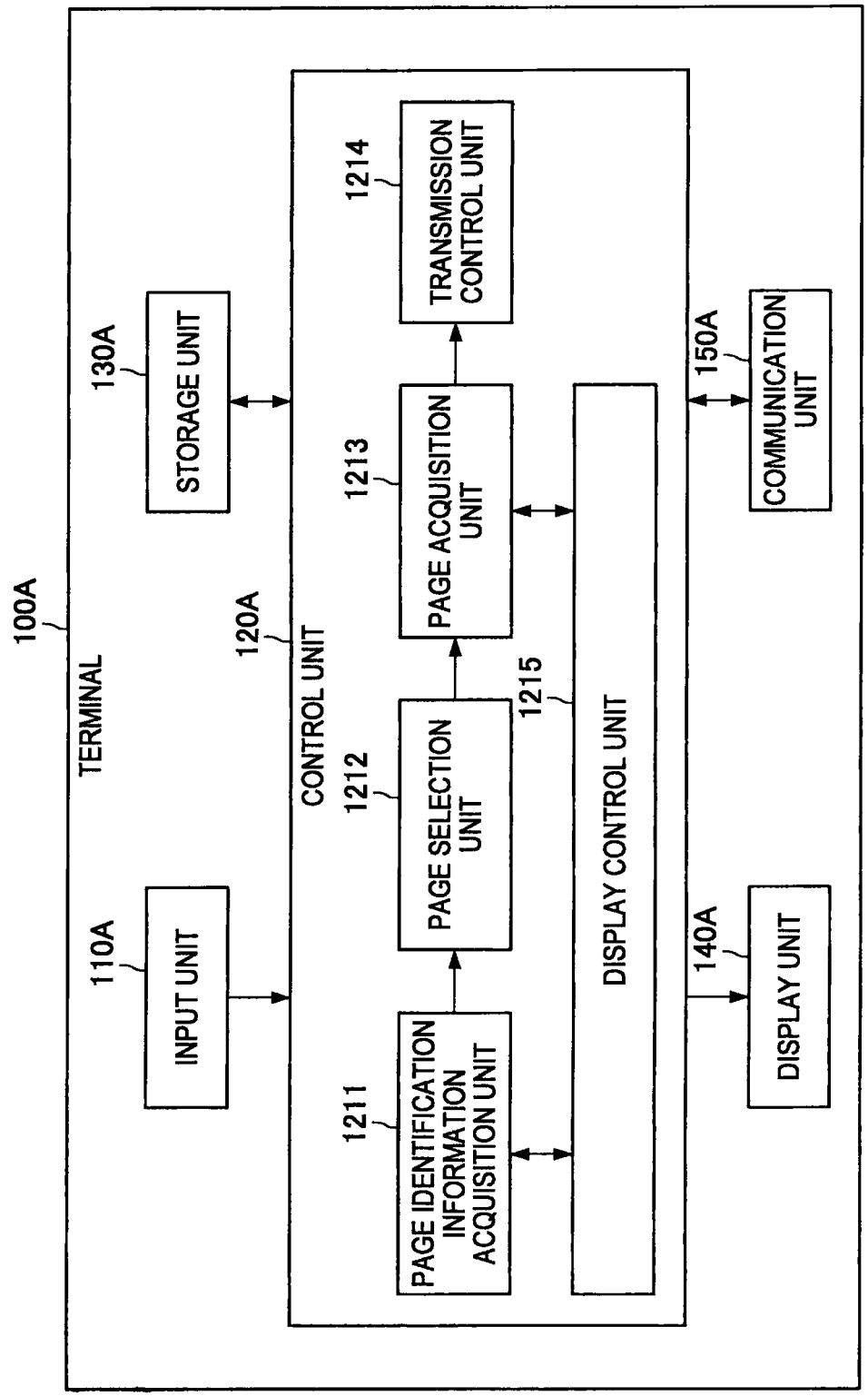
FIG. 2 is a block diagram showing a functional configuration of a first terminal according to the embodiment.

Next, a function of the terminal 100A according to the embodiment of the present disclosure will be described with reference to FIGS. 2 and 3. FIG. 2 is a block diagram showing a functional configuration of the terminal 100A according to the embodiment of the present disclosure. As shown in FIG. 2, the terminal 100A includes an input unit 110A, a control unit 120A, a storage unit 130A, a display unit 140A and a communication unit 150A.

The input unit 110A has a function of receiving input of operation information from the user A. The input unit 110A outputs the operation information, input of which has been received from the user A, to the control unit 120A. The input unit 110A is configured from an input device, for example. The display unit 140A has a function of displaying various types of information under the control of the control unit 120A. The display unit 140A is configured from a display device, for example.

The communication unit 150A has a function of communicating with the history management server 200 and the search server 300 under the control of the control unit 120A. The communication unit 150A is configured from a communication device, for example, and may function as a transmission unit and a reception unit. The storage unit 130A has a function of storing various types of information to be used by the control unit 120A. The storage unit 130A is configured from a storage device, for example.

The control unit 120A has a function of controlling the entire operation of the terminal 100A, and is capable of controlling the operation of the terminal 100A based on operation information output from the input unit 110A, information received by the communication unit 150A, and the like, for example. The control unit 120A includes a page identification information acquisition unit 1211, a page selection unit 1212, a page acquisition unit 1213, a transmission control unit 1214, a display control unit 1215 and the like. The function of each of these functional blocks will be described later in detail. Additionally, the control unit 120A is configured from a CPU, a ROM and a RAM, for example.

Figure 3:
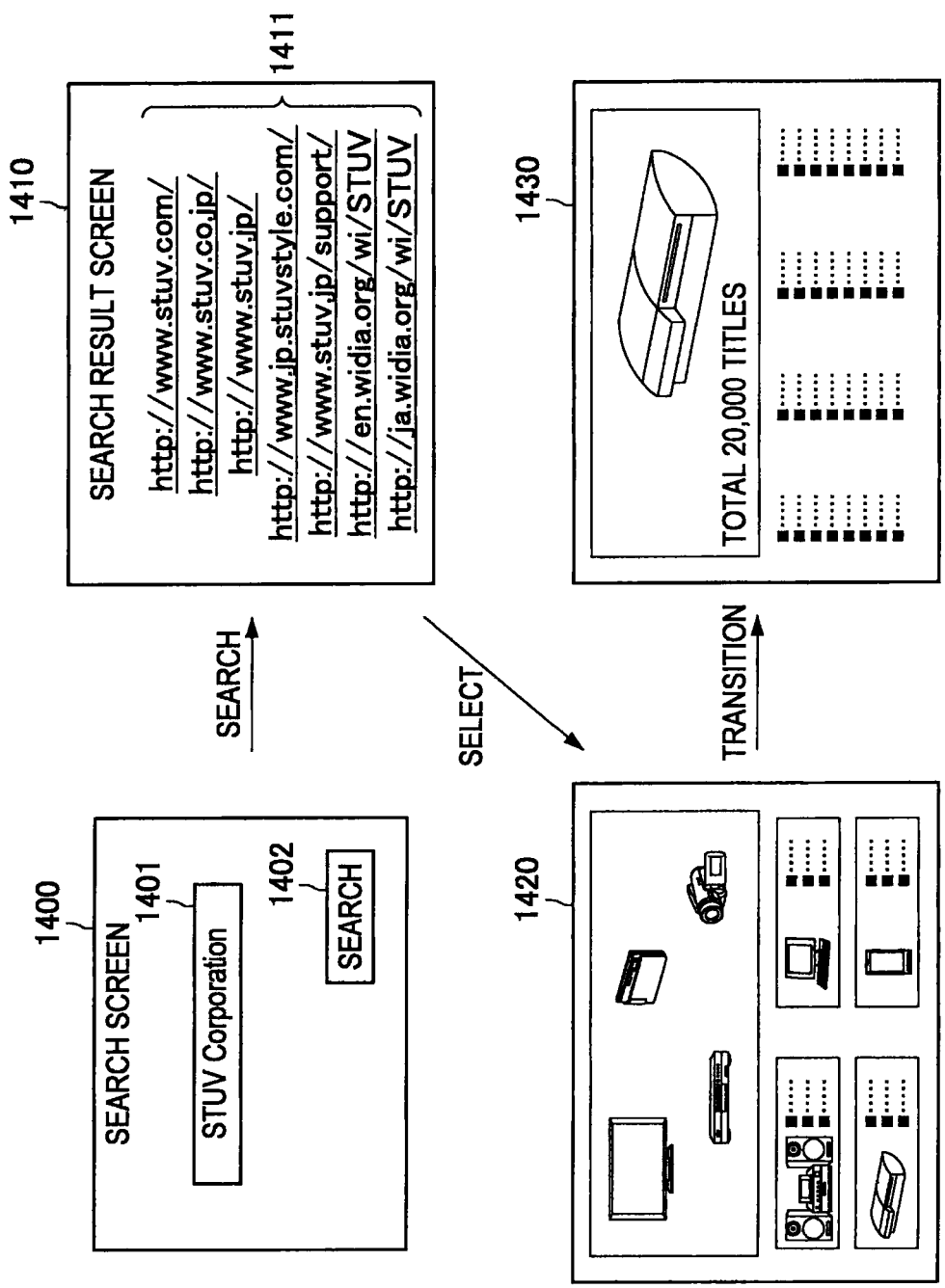
FIG. 3 is a diagram showing an example screen displayed by the first terminal according to the embodiment.

FIG. 3 is a diagram showing an example screen displayed by the terminal 100A according to the embodiment of the present disclosure. The page identification information acquisition unit 1211 acquires, from the search server 300, one or more pieces of page identification information matching a search string. To be more specific, when input of operation information indicating to the effect that a search screen 1400 is to be displayed is received by the input unit 110A, the display control unit 1215 controls the display unit 140A to display the search screen 1400. When input of a search string in a string input box 1401 and input of operation information indicating press down of a search button 1402 are received by the input unit 110A, the communication unit 150A transmits the search string to the search server 300. The page identification information acquisition unit 1211 acquires, as the search result by the search server 300, one or more pieces of page identification information matching the search string.

The display control unit 1215 controls the display unit 140A to display, on a search result screen 1410, information 1411 regarding a page identified by each of the one or more pieces of page identification information acquired by the page identification information acquisition unit 1211. In the example shown in FIG. 3, the page identification information itself is displayed as the information 1411 regarding a page identified by each of the one or more pieces of page identification information acquired by the page identification information acquisition unit 1211. However, the information 1411 regarding a page is not limited to the page identification information itself, and it may be a thumbnail image of a page or certain information describing a page.

The page selection unit 1212 selects page identification information from the one or more pieces of page identification information acquired by the page identification information acquisition unit 1211. To be more specific, when input of operation information indicating selection is received by the input unit 110A, the page selection unit 1212 selects a piece of page identification information from the one or more pieces of page identification information based on the operation information, and the page acquisition unit 1213 acquires a page identified by the selected page identification information. The display control unit 1215 controls the display unit 140A to display the page acquired by the page acquisition unit 1213 as a selected page screen 1420.

The transmission control unit 1214 controls the communication unit 150A to transmit the search string and the page identification information selected by the page selection unit 1212 to the history management server 200. The transmission control unit 1214 may also control the communication unit 150A to further transmit a stay time of the user A at the page acquired by the page acquisition unit 1213 to the history management server 200.

In this case, for example, when input of operation information indicating screen transition is received by the input unit 110A, the display control unit 1215 performs control such that transition is made to an after-transition screen 1430, and the transmission control unit 1214 controls the communication unit 150A to transmit, to the history management server 200, as the stay time, the time from the selection of the page identification information by the page selection unit 1212 to the reception of the operation information indicating screen transition by the input unit 110A.

1.3. Function of History Management Server

Figure 4:
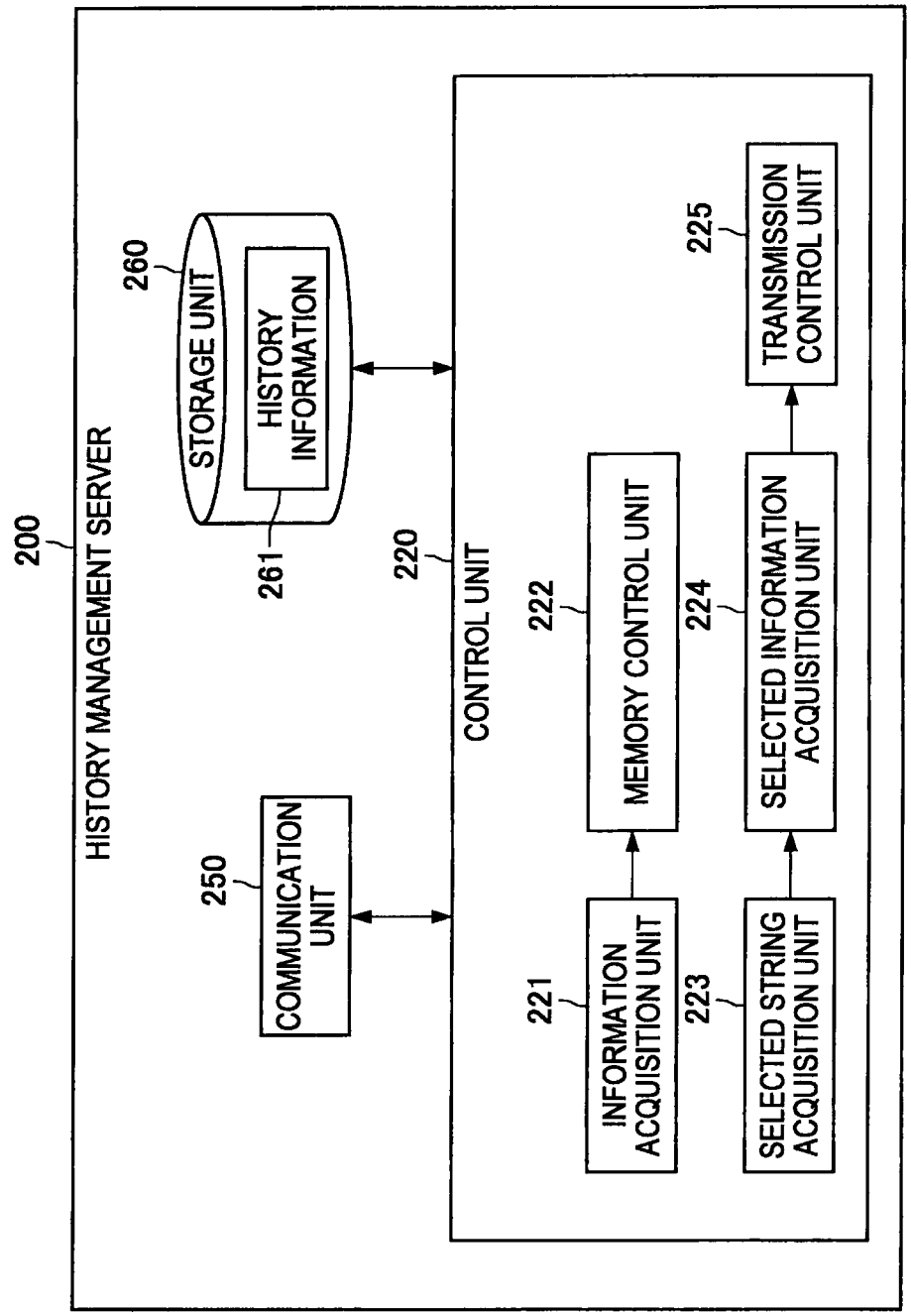
FIG. 4 is a block diagram showing a functional configuration of a history management server according to the embodiment.

Next, a function of the history management server 200 according to the embodiment of the present disclosure will be described with reference to FIGS. 4 and 5. FIG. 4 is a block diagram showing a functional configuration of the history management server 200 according to the embodiment of the present disclosure. As shown in FIG. 4, the history management server 200 includes a control unit 220, a communication unit 250 and a storage unit 260.

The communication unit 250 has a function of communicating with the terminals 100A and 100B under the control of the control unit 220. The communication unit 250 is configured from a communication device, for example, and may function as a transmission unit and a reception unit. The storage unit 260 has a function of storing various types of information to be used by the control unit 220, and has a function of storing, for each search string, one or more pieces of selected information selected from one or more pieces of page identification information obtained by using the search string. The storage unit 260 is configured from a storage device, for example.

The control unit 220 has a function of controlling the entire operation of the history management server 200, and is capable of controlling the operation of the history management server 200 based on information received by the communication unit 250, for example. The control unit 220 includes an information acquisition unit 221, a memory control unit 222, a selected string acquisition unit 223, a selected information acquisition unit 224, a transmission control unit 225 and the like. The function of each of these functional blocks will be described later in detail. Additionally, the control unit 220 is configured from a CPU, a ROM and a RAM, for example.

FIG. 5 is a diagram showing an example structure of history information 261 managed by the history management server 200 according to the embodiment of the present disclosure. As shown in FIG. 5, the history information 261 includes a search string and an URL, which is an example of page identification information. Furthermore, as shown in FIG. 5, the history information 261 may also include the number of times of selection, a stay time and the like. The information acquisition unit 221 has a function of acquiring a search string and page identification information from the terminal 100A.

In the case a combination of a search string and page identification information acquired by the information acquisition unit 221 is not yet registered in the history information 261, the memory control unit 222 registers the combination of the search string and the page identification information in the history information 261. In this case, the memory control unit 222 sets the number of times of selection for this combination to "1." Furthermore, in the case the stay time is further acquired by the information acquisition unit 221, the memory control unit 222 sets the stay time acquired by the information acquisition unit 221 as the stay time for this combination.

In the case the combination of the search string and the page identification information acquired by the information acquisition unit 221 is already registered in the history information 261, the memory control unit 222 does not have to register the combination of the search string and the page identification information in the history information 261. In this case, the memory control unit 222 adds "1" to the number of times of selection for this combination. Furthermore, in the case the stay time is further acquired by the information acquisition unit 221, the memory control unit 222 adds the stay time acquired by the information acquisition unit 221 to the stay time for this combination.

The selected string acquisition unit 223 has a function of acquiring a selected string from the terminal 100B. The selected information acquisition unit 224 has a function of acquiring, from the storage unit 260, selected information matching the selected string acquired from the terminal 100B by the selected string acquisition unit 223. To be more specific, the selected information acquisition unit 224 acquires, from the history information 261, as the selected information, an URL (an example of page identification information) that is related to a search string that is identical or that is similar to the selected string acquired from the terminal 100B by the selected string acquisition unit 223. A search string that is similar to the selected string may be a search string including the whole of the selected string or it may be a search string including a part of the selected string.

The selected information acquisition unit 224 may also further acquire, from the history information 261, the selected string, and the number of times of selection and the stay time related to the selected information. The transmission control unit 225 controls the communication unit 250 to transmit the selected information acquired by the selected information acquisition unit 224 to the terminal 100B. Furthermore, a case is also conceivable where there are a plurality of pieces of selected information matching the selected string acquired by the selected string acquisition unit 223 from the terminal 100B.

In the case there are a plurality of pieces of selected information matching the selected string acquired by the selected string acquisition unit 223 from the terminal 100B, the transmission control unit 225 may control the communication unit 250 to further transmit the number of times of selection acquired by the selected information acquisition unit 224 to the terminal 100B. Alternatively, the transmission control unit 225 may control the communication unit 250 to transmit the rank regarding the number of times of selection to the terminal 100B. Alternatively, the transmission control unit 225 may determine selected information with the largest number of times of selection, and control the communication unit 250 to transmit the selected information with the largest number of times of selection.

Furthermore, in the case there are a plurality of pieces of selected information matching the selected string acquired by the selected string acquisition unit 223 from the terminal 100B, the transmission control unit 225 may control the communication unit 250 to transmit the average stay time that is obtained by dividing the stay time by the number of times of selection to the terminal 100B. Alternatively, the transmission control unit 225 may determine selected information with the longest average stay time, and control the communication unit 250 to transmit the selected information with the longest average stay time.

1.4. Function of Second Terminal

Figure 6:
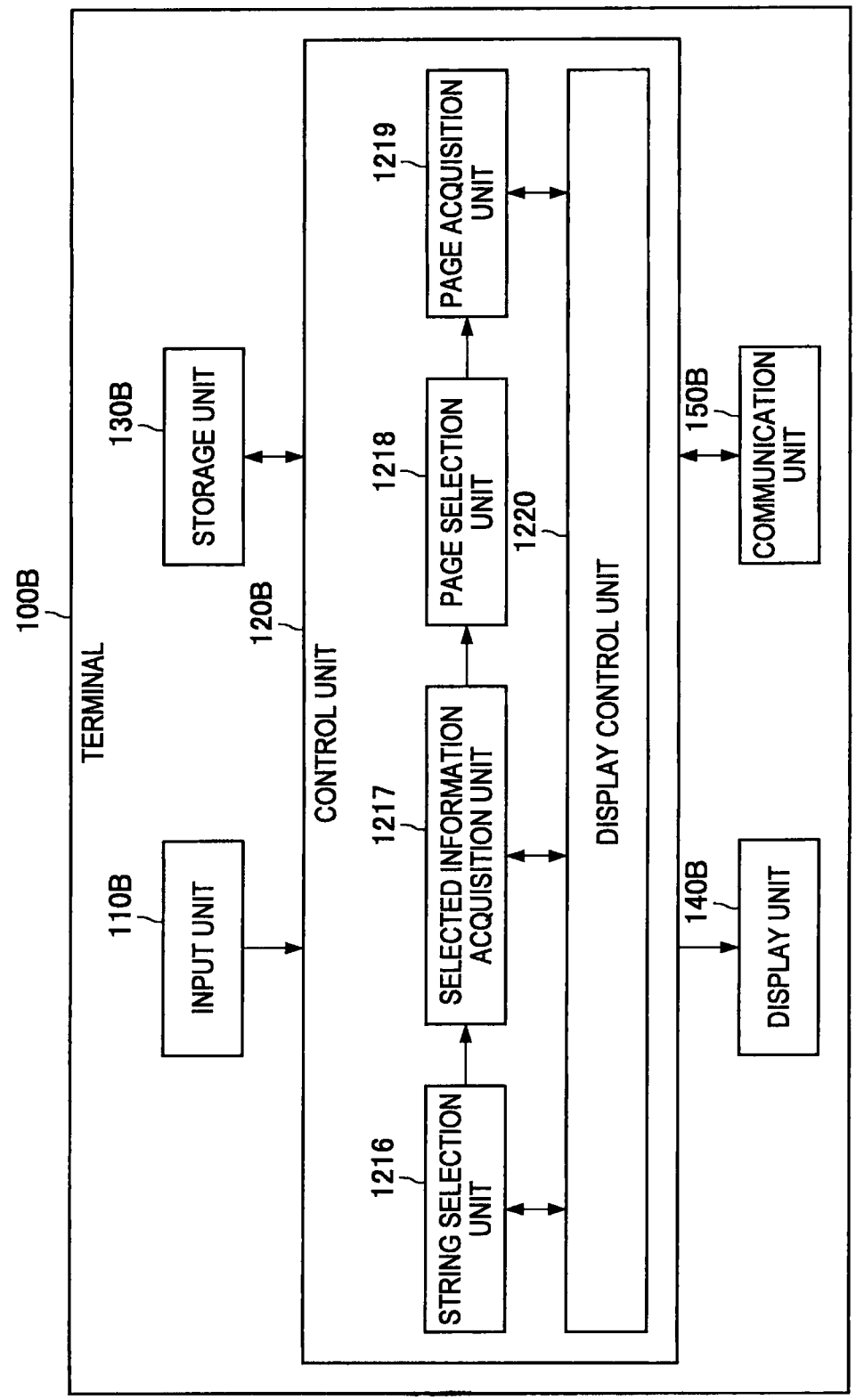
FIG. 6 is a block diagram showing a functional configuration of a second terminal according to the embodiment.

Next, a function of the terminal 100B according to the embodiment of the present disclosure will be described with reference to FIGS. 6 to 9. FIG. 6 is a block diagram showing a functional configuration of the terminal 100B according to the embodiment of the present disclosure. As shown in FIG. 6, the terminal 100B includes an input unit 110B, a control unit 120B, a storage unit 130B, a display unit 140B and a communication unit 150B.

The input unit 110B has a function of receiving input of operation information from the user B. The input unit 110B outputs the operation information, input of which has been received from the user B, to the control unit 120B. The input unit 110B is configured from an input device, for example. The display unit 140B has a function of displaying various types of information under the control of the control unit 120B. The display unit 140B is configured from a display device, for example.

The communication unit 150B has a function of communicating with the history management server 200 and the search server 300 under the control of the control unit 120B. The communication unit 150B is configured from a communication device, for example, and may function as a transmission unit and a reception unit. The storage unit 130B has a function of storing various types of information to be used by the control unit 120B. The storage unit 130B is configured from a storage device, for example.

The control unit 120B has a function of controlling the entire operation of the terminal 100B, and is capable of controlling the operation of the terminal 100B based on the operation information output from the input unit 110B, information received by the communication unit 150B, and the like, for example. The control unit 120B includes a string selection unit 1216, a selected information acquisition unit 1217, a page selection unit 1218, a page acquisition unit 1219, a display control unit 1220 and the like. The function of each of these functional blocks will be described later in detail. Additionally, the control unit 120A is configured from a CPU, a ROM and a RAM, for example.

Figure 7:
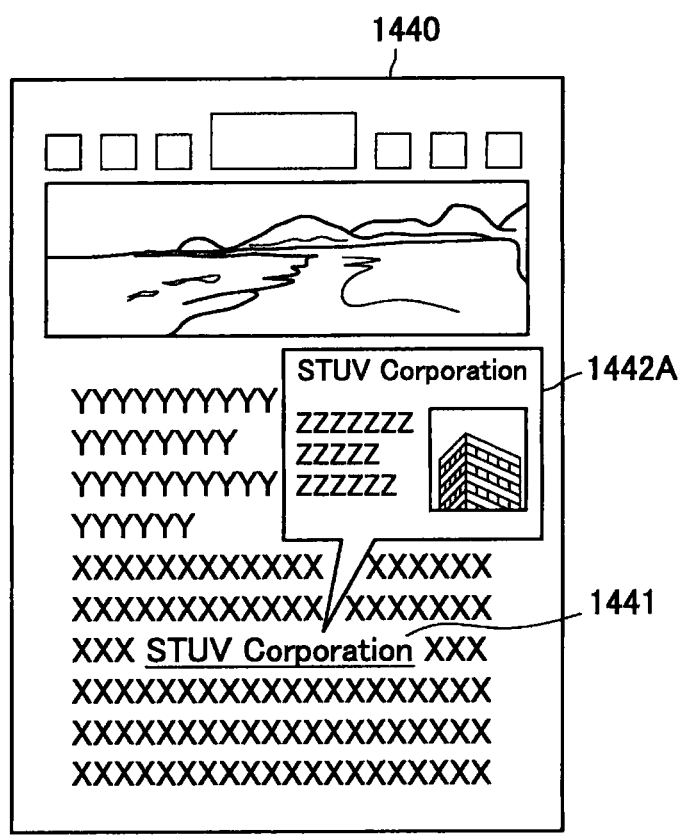
FIG. 7 is a diagram showing an example screen displayed by the second terminal according to the embodiment.

FIG. 7 is a diagram showing an example screen displayed by the terminal 100B according to the embodiment of the present disclosure. A page 1440 shown in FIG. 7 is a page searched and acquired by the search server 300 in response to a request from the control unit 120B, for example, and the page 1440 is displayed on the display unit 140B under the control of the display control unit 1220. If an obscure string is present on the page 1440, for example, the user B would want to look up the obscure string and input, to the input unit 110B, operation information for specifying the obscure string.

The string selection unit 1216 selects a string included in the page 1440 as a selected string based on operation information input to the input unit 110B by the user B, for example. In the case a mouse is used as the input unit 110B, when a click or a double-click on a string included in the page 1440 is received by the input unit 110B, the string selection unit 1216 can select the string as the selected string, for example.

The selected information acquisition unit 1217 acquires selected information matching the selected string from the history management server 200. The display control unit 1220 performs control such that information 1442 regarding a page identified by the selected information acquired by the selected information acquisition unit 1217 is displayed. In the example shown in FIG. 7, the display control unit 1220 controls the display unit 140B to display, as the information 1442 regarding a page, information 1442A for describing the page. In the example shown in FIG. 7, the information 1442 for describing the page includes the selected string, lines describing the selected string, an image related to the selected string, and the like.

Additionally, the information 1442 regarding the page may be stored in the storage unit 130B of the terminal 100B, or may be acquired together with the page 1440 by the search by the search server 300. Also, the information 1442 regarding the page may be acquired from another server that is not shown in the drawing. The position at which the information 1442 regarding the page is displayed may be within or outside the page 1440.

Figure 8:
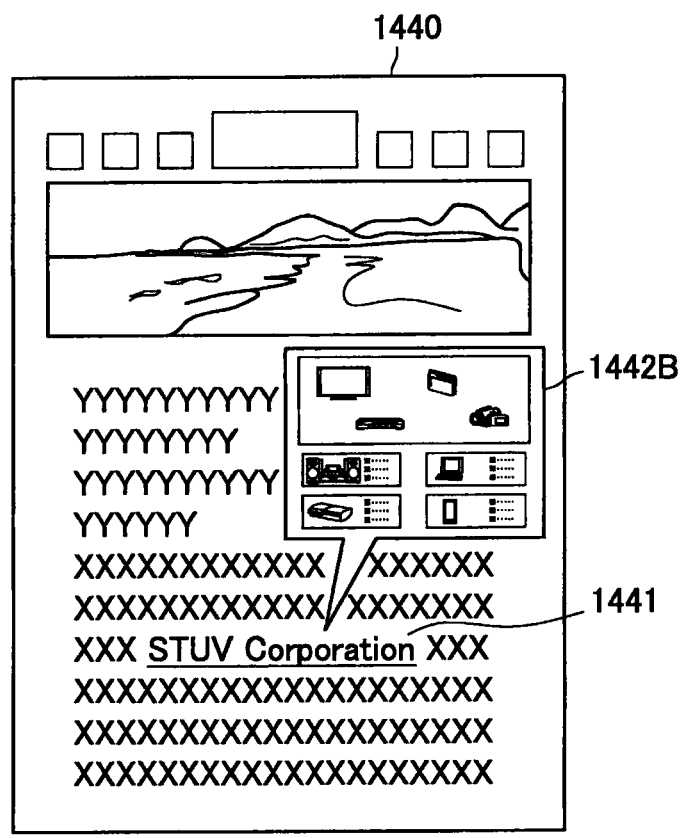
FIG. 8 is a diagram showing an example screen displayed by the second terminal according to the embodiment.

FIG. 8 is a diagram showing an example screen displayed by the terminal 100B according to the embodiment of the present disclosure. As with the page 1440 shown in FIG. 7, a page 1440 shown in FIG. 8 is a page searched and acquired by the search server 300 in response to a request from the control unit 120B, for example, and the page 1440 is displayed on the display unit 140B under the control of the display control unit 1220. As in the case shown in FIG. 7, the string selection unit 1216 selects a string included in the page 1440 as the selected string based on operation information input to the input unit 110B by the user B, for example.

As in the case shown in FIG. 7, the selected information acquisition unit 1217 acquires, from the history management server 200, selected information matching the selected string. The display control unit 1220 performs control such that information 1442 regarding a page identified by the selected information acquired by the selected information acquisition unit 1217 is displayed. In the example shown in FIG. 8, the display control unit 1220 controls the display unit 140B to display, as the information 1442 regarding a page, a thumbnail image 1442B of the page.

Figure 9:
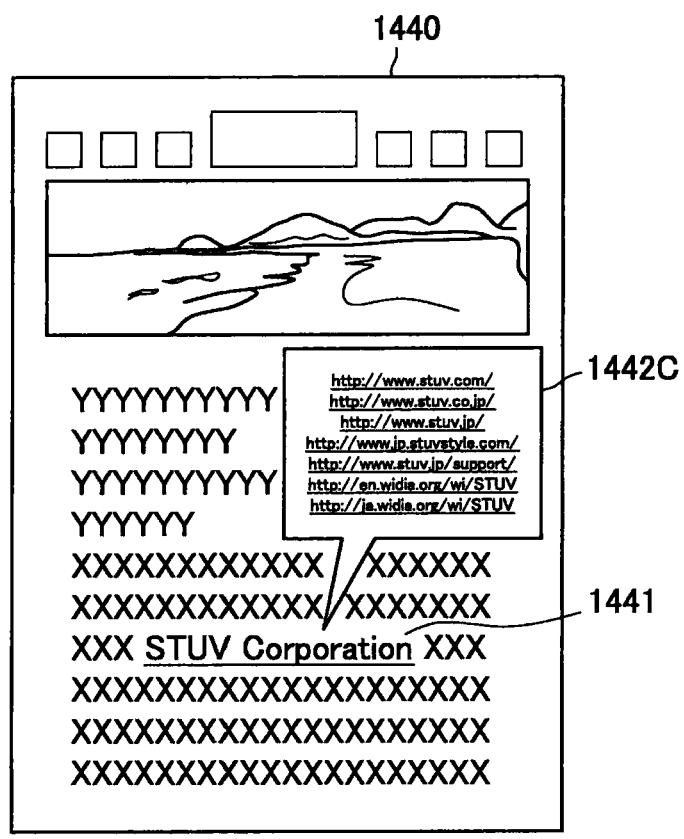
FIG. 9 is a diagram showing an example screen displayed by the second terminal according to the embodiment.

FIG. 9 is a diagram showing an example screen displayed by the terminal 100B according to the embodiment of the present disclosure. As with the page 1440 shown in FIG. 7, a page 1440 shown in FIG. 9 is a page searched and acquired by the search server 300 in response to a request from the control unit 120B, for example, and the page 1440 is displayed on the display unit 140B under the control of the display control unit 1220. As in the case shown in FIG. 7, the string selection unit 1216 selects a string included in the page 1440 as the selected string based on operation information input to the input unit 110B by the user B, for example.

As in the case shown in FIG. 7, the selected information acquisition unit 1217 acquires, from the history management server 200, selected information matching the selected string. The display control unit 1220 performs control such that information 1442 regarding a page identified by the selected information acquired by the selected information acquisition unit 1217 is displayed. In the example shown in FIG. 9, the display control unit 1220 controls the display unit 140B to display, as the information 1442 regarding a page, page identification information 1442C for identifying the page.

Additionally, the selected information acquisition unit 1217 may acquire selected information with the largest number of times of selection, determined among one or more pieces of selected information acquired from the history management server 200. The selected information with the largest number of times of selection may be determined by the history management server 200 or may be determined by the selected information acquisition unit 1217. Also, the selected information acquisition unit 1217 may acquire selected information with the longest average stay time, determined among one or more pieces of selected information acquired from the history management server 200. The selected information with the longest average stay time may be determined by the history management server 200 or may be determined by the selected information acquisition unit 1217.

The selected information acquisition unit 1217 may also acquire, together with the one or more pieces of selected information matching the selected string, the rank regarding the number of times of selection of each of the one or more pieces of selected information. In this case, the display control unit 1220 may control the display unit 140B to display the information 1442 regarding a page identified by the one or more pieces of selected information acquired by the selected information acquisition unit 1217 in the order according to the rank of each of the one or more pieces of selected information. The rank regarding the number of times of selection of each of the one or more pieces of selected information may be acquired from the history management server 200 or may be calculated by the selected information acquisition unit 1217 based on the number of times of selection of each of the one or more pieces of selected information.

The selected information acquisition unit 1217 may acquire, together with the one or more pieces of selected information matching the selected string, the rank regarding the average stay time at a page identified by each of the one or more pieces of selected information. In this case, the display control unit 1220 may control the display unit 140B to display the information 1442 regarding a page identified by the one or more pieces of selected information acquired by the selected information acquisition unit 1217 in the order according to the rank of each of the one or more pieces of selected information. The rank regarding the average stay time at each of the one or more pieces of selected information may be acquired from the history management server 200 or may be calculated by the selected information acquisition unit 1217 based on the average stay time at each of the one or more pieces of selected information.

Additionally, if the ranks are calculated by the history management server 200, an effect is obtained that the burden on the terminal 100B can be reduced. Also, if the ranks are calculated by the history management server 200, an effect is obtained that the history management server 200 can remove page identification information (for example, an URL) for identifying a page that no longer exists from the history information 261.

Furthermore, if the ranks are calculated by the selected information acquisition unit 1217 of the terminal 100B, an effect is obtained that a rule for performing ranking (for example, a rule for deciding whether to performing ranking using the average stay time or the number of times of selection) can be determined for each user using the terminal 100.

Referring back to FIG. 6, we will continue with the explanation. The page selection unit 1218 can select one piece of selected information from one or more pieces of selected information acquired by the selected information acquisition unit 1217. To be more specific, when input of operation information indicating selection is received by the input unit 110B, the page selection unit 1218 selects one piece of selected information from the one or more pieces of selected information based on the operation information. The page acquisition unit 1219 can acquire a page identified by the selected information which has been selected. The display control unit 1220 can also control the display unit 140B to display the page acquired by the page acquisition unit 1219.

1.5. Operation of Information Processing System

Figure 10:
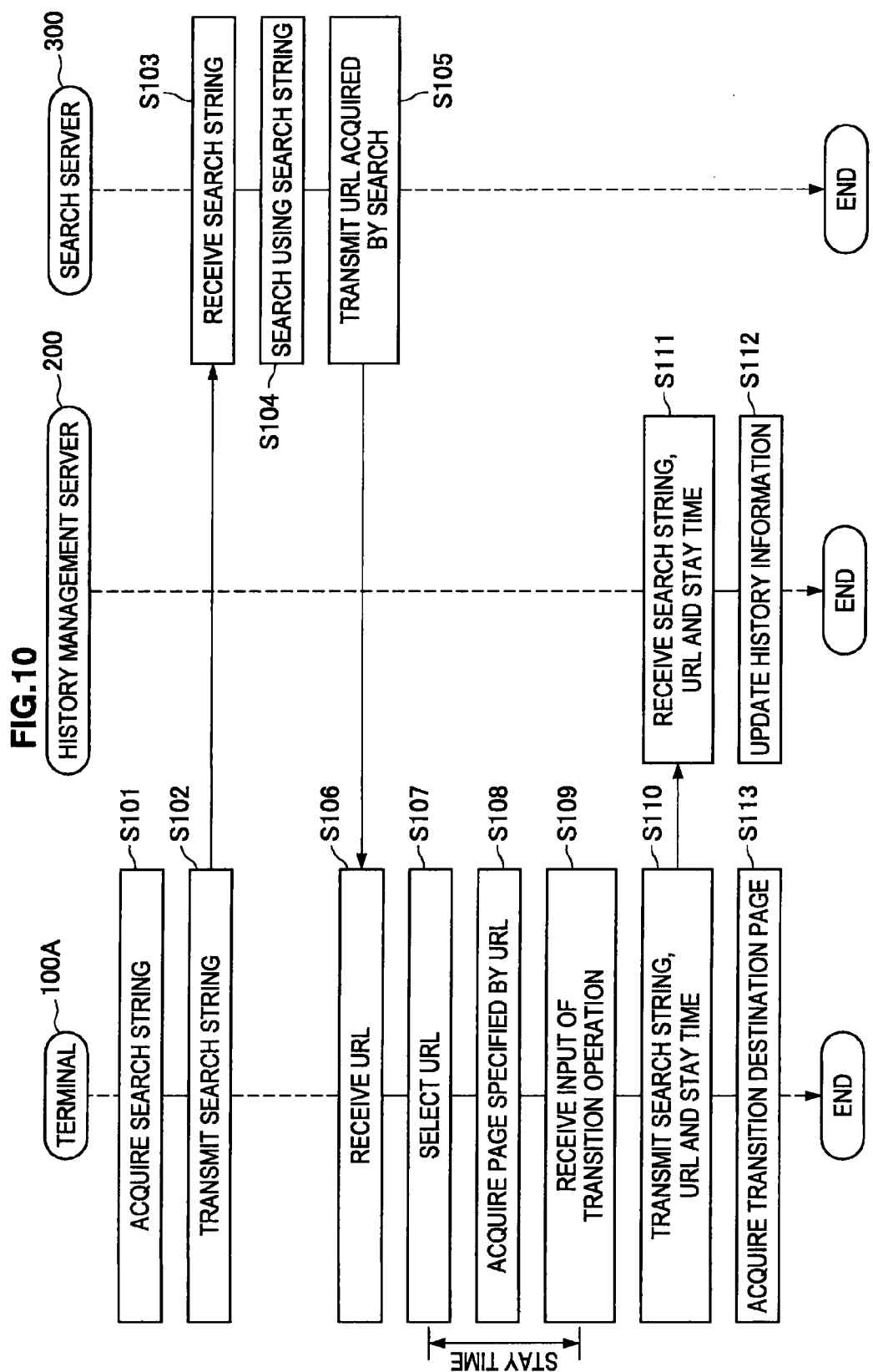
FIG. 10 is a flow chart showing an operation performed at the time of accumulation of history information by the information processing system according to the embodiment.

Next, an operation of the information processing system 10 according to the embodiment of the present disclosure will be described with reference to FIGS. 10 and 11. FIG. 10 is a flow chart showing an operation performed at the time of accumulation of history information by the information processing system 10 according to the embodiment of the present disclosure. Additionally, an explanation will be given taking an URL as an example of the page identification information.

As shown in FIG. 10, the page identification information acquisition unit 1211 of the terminal 100A acquires a search string (step S101), and controls the communication unit 150A to transmit the acquired search string to the search server 300 (step S102). The search server 300 receives the search string from the terminal 100A (step S103), and performs a search using the received search string (step S104). The search server 300 transmits an URL acquired by the search to the terminal 100A (step S105).

The page identification information acquisition unit 1211 of the terminal 100A acquires the URL received from the search server 300 by the communication unit 150A (step S106), and the page selection unit 1212 selects the URL (step S107). Then, the page acquisition unit 1213 acquires a page specified by the URL selected by the page selection unit 1212 (step S108). When input of transition operation is received by the input unit 110A (step S109), the transmission control unit 1214 controls the communication unit 150B to transmit the search string, the URL selected by the page selection unit 1212 and the stay time to the history management server 200. The stay time does not have to be transmitted to the history management server 200.

The information acquisition unit 221 of the history management server 200 acquires the search string, the URL and the stay time received by the communication unit 250 (step S111), and the memory control unit 222 updates the history information 261 by the search string, the URL and the stay time acquired by the information acquisition unit 221 (step S112). The page acquisition unit 1213 acquires a page which is a transition destination (step S113). The display control unit 1215 can also control the display unit 140A to display the page, which is a transition destination, acquired by the page acquisition unit 1213.

Figure 11:
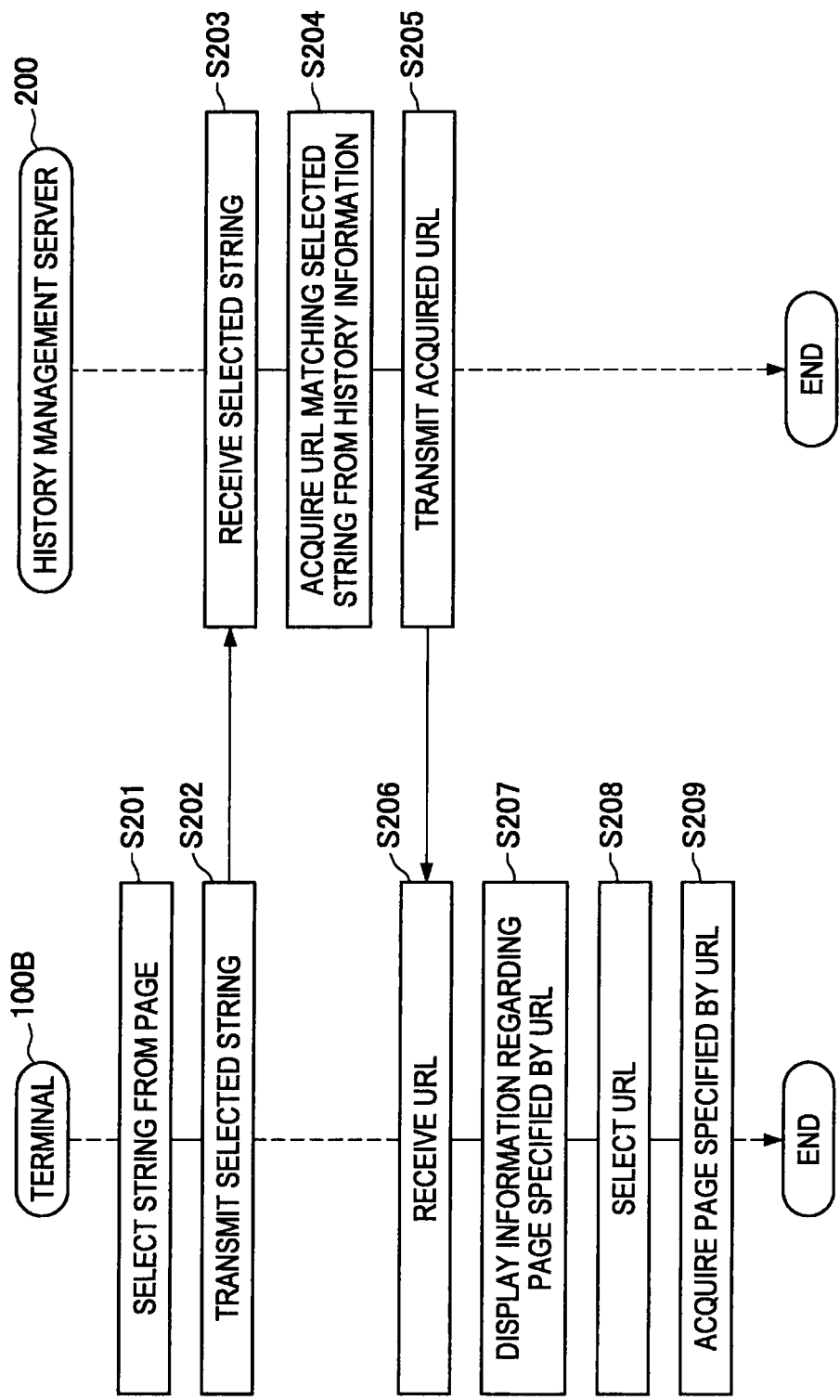
FIG. 11 is a flow chart showing an operation performed at the time of a search by the information processing system according to the embodiment.

FIG. 11 is a flow chart showing an operation performed at the time of a search by the information processing system 10 according to the embodiment of the present disclosure. Additionally, an explanation will be given taking an URL as an example of the page identification information.

As shown in FIG. 11, the string selection unit 1216 of the terminal 100B selects a string from a page as a selected string (step S201), and the selected information acquisition unit 1217 controls the communication unit 150B to transmit the selected string to the history management server 200 (step S202). The selected string acquisition unit 223 of the history management server 200 acquires the selected string received from the terminal 100B by the communication unit 250 (step S203), and the selected information acquisition unit 224 acquires, from the history information 261, an URL matching the selected string which has been acquired (step S204).

As has been described, the selected information acquisition unit 224 can also acquire the URL, taking into consideration the average stay time, the number of times of selection or the like. The transmission control unit 225 controls the communication unit 250 to transmit the URL acquired by the selected information acquisition unit 224 to the terminal 100B (step S205). The selected information acquisition unit 1217 of the terminal 100B acquires the URL received by the communication unit 150B (step S206), and the display control unit 1220 controls the display unit 140B to display information regarding a page specified by the URL acquired by the selected information acquisition unit 1217 (step S207).

The page selection unit 1218 selects the URL acquired by the selected information acquisition unit 1217 (step S208), and the page acquisition unit 1219 acquires the page specified by the URL selected by the page selection unit 1218 (step S209). The display control unit 1220 can also control the display unit 140B to display the page acquired by the page acquisition unit 1219.

1.6. Hardware Configuration of Information Processing Apparatus

Figure 12:
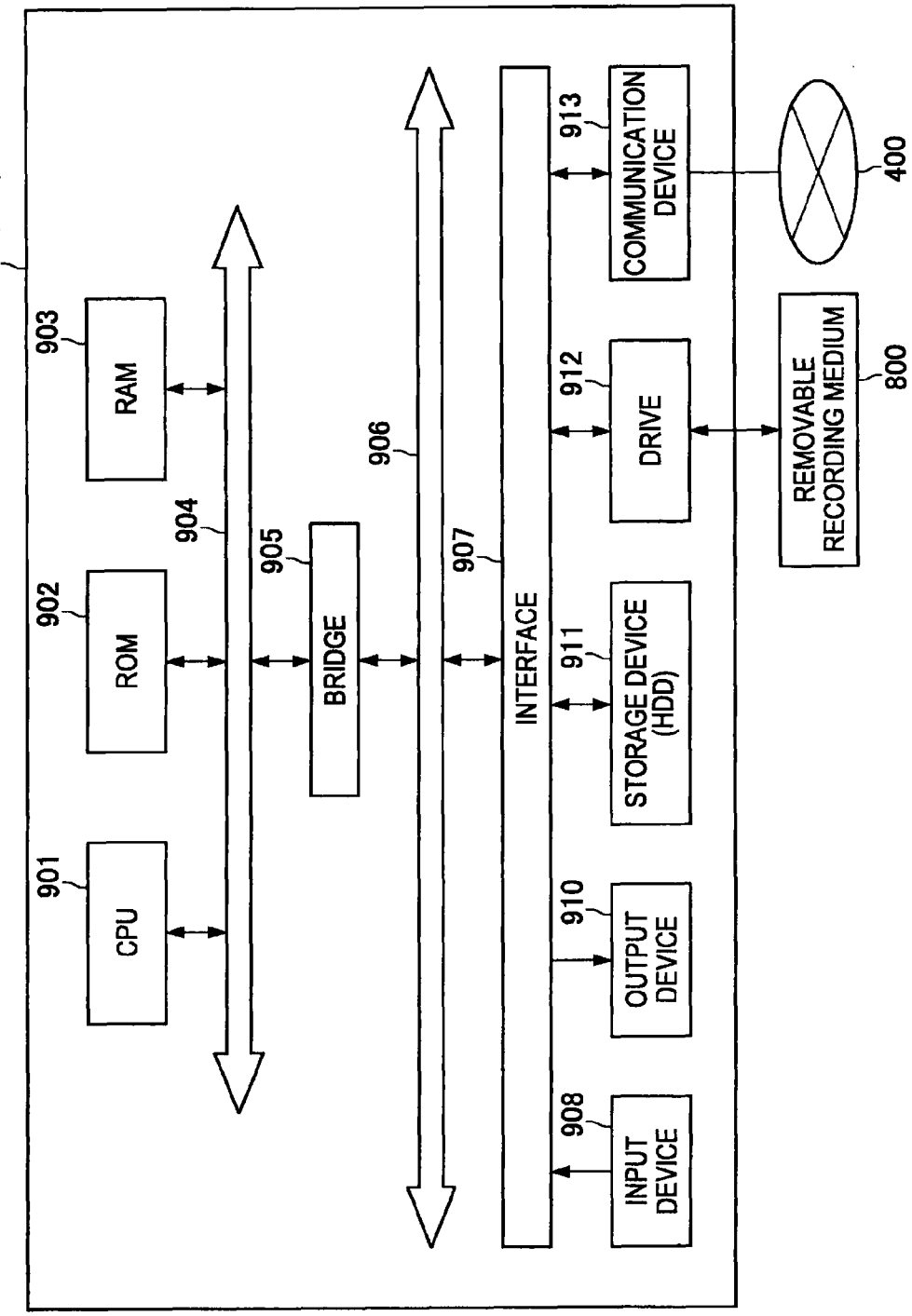
FIG. 12 is a block diagram showing a hardware configuration of an information processing apparatus according to the embodiment.

Next, a hardware configuration of an information processing apparatus according to the embodiment of the present disclosure will be described with reference to FIG. 12. FIG. 12 is a block diagram showing a hardware configuration of an information processing apparatus according to the embodiment of the present disclosure.

In the example described above, the terminal 100, the history management server 200 and the search server 300 correspond to the information processing apparatus. These information processing apparatuses mainly include a CPU 901, a ROM 902, a RAM 903, a host bus 904, a bridge 905, an external bus 906, an interface 907, an input device 908, an output device 910, a storage device 911, a drive 912 and a communication device 913.

The CPU 901 functions as an arithmetic processing unit and a control unit, and controls entire operation or a part of operation of the information processing apparatus according to various programs recorded on the ROM 902, the RAM 903, the storage device 911, or a removable recording medium 800. The ROM 902 stores programs to be used by the CPU 901, arithmetic parameters and the like. The RAM 903 temporarily stores programs to be used in the execution of the CPU 901, parameters that vary as appropriate in the execution, and the like. These are connected to each other by the host bus 904 configured from an internal bus such as a CPU bus.

The host bus 904 is connected through the bridge 905 to the external bus 906 such as a PCI (Peripheral Component Interconnect/Interface) bus.

The input device 908 is input means to be operated by a user, such as a mouse, a keyboard, a touch panel, a button, a switch, a lever or the like. Further, the input device 908 may be remote control means that uses an infrared or another radio wave, or it may be an externally-connected appliance such as a mobile phone, a PDA or the like conforming to the operation of the information processing apparatus. Furthermore, the input device 908 is configured from an input control circuit or the like for generating an input signal based on information input by a user with the operation means described above and outputting the signal to the CPU 901. A user of the information processing apparatus can input various kinds of data to the information processing apparatus or instruct the information processing apparatus to perform processing, by operating the input device 908.

The output device 910 is configured from a device that is capable of visually or auditorily notifying a user of acquired information, such as a display device such as a CRT display device, a liquid crystal display device, a plasma display device, an EL display device or a lamp, an audio output device such as a speaker or a headphone, a printer, a mobile phone, a facsimile and the like. The output device 910 outputs results obtained by various processes performed by the information processing apparatus, for example. To be specific, the display device displays, in the form of text or image, results obtained by various processes performed by the information processing apparatus. On the other hand, the audio output device converts an audio signal such as reproduced audio data or acoustic data into an analogue signal, and outputs the analogue signal.

The storage device 911 is a device for storing data configured as an example of a storage unit of the information processing apparatus, and is configured from, for example, a magnetic storage device such as a HDD (Hard Disk Drive), a semiconductor storage device, an optical storage device, or a magneto-optical storage device. This storage device 911 stores programs to be executed by the CPU 901, various types of data, and acoustic signal data, image signal data and the like acquired from the outside.

The drive 912 is a reader/writer for a recording medium, and is incorporated in or attached externally to the information processing apparatus. The drive 912 reads information recorded in the attached removable recording medium 800 such as a magnetic disk, an optical disk, a magneto-optical disk, or a semiconductor memory, and outputs the information to the RAM 903. Furthermore, the drive 912 can write in the attached removable recording medium 800 such as a magnetic disk, an optical disk, a magneto-optical disk, or a semiconductor memory. The removable recording medium 800 is, for example, a DVD medium, an HD-DVD medium, a Blu-ray (registered trademark) medium, a CompactFlash (CF; registered trademark), a memory stick, or an SD memory card (Secure Digital Memory Card). Alternatively, the removable recording medium 800 may be, for example, an electronic appliance or an IC card (Integrated Circuit Card) equipped with a non-contact IC chip.

The communication device 913 is a communication interface configured from, for example, a communication device for connecting to a network 400. The communication device 913 is, for example, a wired or wireless LAN (Local Area Network), a Bluetooth (registered trademark), a communication card for WUSB (Wireless USB), a router for optical communication, a router for ADSL (Asymmetric Digital Subscriber Line), or a modem for various communications. This communication device 913 can transmit and receive acoustic signals and the like on the Internet and with other communication devices, for example. The network 400 connected to the communication device 913 is configured from a network or the like connected via wire or wirelessly, and may be, for example, the Internet, a home LAN, infrared communication, radio wave communication, or satellite communication.

In the foregoing, an example of the hardware configuration capable of realizing the function of the information processing apparatus according to the embodiment of the present disclosure has been described. Each structural element described above may be configured from a general-purpose material or may be configured from hardware dedicated to the function of each structural element. Accordingly, hardware configuration to be used may be changed as appropriate according to the level of technology at the time of carrying out the embodiment of the present disclosure.

2. Summary

As described above, according to the embodiment of the present disclosure, the history management server 200 manages, for each search string, one or more pieces of selected information selected from one or more pieces of page identification information obtained by using the search string. Also, the terminal 100B acquires selected information matching the selected string, and performs control such that information regarding a page identified by the selected information is displayed. Accordingly, the burden of performing a search using a string present in a page can be reduced.

According to the embodiment of the present disclosure, a page including an explanation on an obscure string included in a page can be appropriately presented to a user, for example. A more appropriate page can be presented to a user as the amount of history information managed by the history management server 200 increases. Also, if pieces of information regarding a plurality of pages are made to be presented to a user in a ranking format, the user can easily select a desired page himself/herself. Furthermore, the method according to the embodiment of the present disclosure can be applied to any kind of page, and thus a search operation by a user can be easily performed.

It should be understood by those skilled in the art that various modifications, combinations, sub-combinations and alterations may occur depending on design requirements and other factors insofar as they are within the scope of the appended claims or the equivalents thereof.

For example, the steps of the processing of the information processing apparatus according to the present specification do not necessarily have to be processed chronologically according to the order described as the flow chart. For example, the steps of the processing of the information processing apparatus can also be processed in an order different from that described as the flow chart or may be processed in parallel.

Furthermore, a computer program for causing hardware, such as the CPU 901, the ROM 902 or the RAM 903, embedded in the information processing apparatus to realize an equivalent function as each element of the information processing apparatus described above can also be created. Furthermore, a storage medium storing the computer program is also provided.

Additionally, the present technology may also be configured as below.

(1) An information processing apparatus including:
a selected information acquisition unit for acquiring, from a history management server managing, for each search string, one or more pieces of selected information selected from one or more pieces of page identification information obtained by using the search string, selected information matching a selected string; and
a display control unit for performing control such that information regarding a page identified by the selected information acquired by the selected information acquisition unit is displayed.

(2) The information processing apparatus according to (1), further including:
a string selection unit for selecting a string included in a page as the selected string.

(3) The information processing apparatus according to (1) or (2),
wherein the history management server further manages a number of times of selection of each of the one or more pieces of selected information, and
wherein the selected information acquisition unit acquires selected information with a largest number of times of selection, determined among the one or more pieces of selected information.

(4) The information processing apparatus according to (1) or (2),
wherein the history management server further manages an average stay time at a page identified by each of the one or more pieces of selected information, and
wherein the selected information acquisition unit acquires selected information with a longest average stay time, determined among the one or more pieces of selected information.

(5) The information processing apparatus according to (1) or (2),
wherein the selected information acquisition unit acquires, together with the one or more pieces of selected information matching the selected string, a rank regarding a number of times of selection of each of the one or more pieces of selected information, and
wherein the display control unit performs control such that information regarding a page identified by the one or more pieces of selected information acquired by the selected information acquisition unit is displayed in an order according to the rank of each of the one or more pieces of selected information.

(6) The information processing apparatus according to (1) or (2), wherein the selected information acquisition unit acquires, together with the one or more pieces of selected information matching the selected string, a rank regarding an average stay time at a page identified by each of the one or more pieces of selected information, and wherein the display control unit performs control such that information regarding the page identified by each of the one or more pieces of selected information acquired by the selected information acquisition unit is displayed in an order according to the rank of each of the one or more pieces of selected information.

(7) An information processing method including:

acquiring, from a history management server managing, for each search string, one or more pieces of selected information selected from one or more pieces of page identification information obtained by using the search string, selected information matching a selected string; and performing control such that information regarding a page identified by the selected information which has been acquired is displayed.

(8) A program for causing a computer to function as an information processing apparatus including:

a selected information acquisition unit for acquiring, from a history management server managing, for each search string, one or more pieces of selected information selected from one or more pieces of page identification information obtained by using the search string, selected information matching a selected string; and a display control unit for performing control such that information regarding a page identified by the selected information acquired by the selected information acquisition unit is displayed.

(9) An information processing apparatus including:

a page identification information acquisition unit for acquiring, from a search server, one or more pieces of page identification information matching a search string;

a page selection unit for selecting page identification information from the one or more pieces of page identification information acquired by the page identification information acquisition unit; and a transmission control unit for performing control such that the search string and the page identification information selected by the page selection unit are transmitted to a history management server.

(10) An information processing method including:

acquiring, from a search server, one or more pieces of page identification information matching a search string;

selecting page identification information from the one or more pieces of page identification information which have been acquired; and performing control such that the search string and the page identification information are transmitted to a history management server.

(11) A program for causing a computer to function as an information processing apparatus including:

a page identification information acquisition unit for acquiring, from a search server, one or more pieces of page identification information matching a search string;

a page selection unit for selecting page identification information from the one or more pieces of page identification information acquired by the page identification information acquisition unit; and a transmission control unit for performing control such that the search string and the page identification information selected by the page selection unit are transmitted to a history management server.

(12) A history management server including:

a storage unit storing, for each search string, one or more pieces of selected information selected from one or more pieces of page identification information obtained by using the search string;

a selected information acquisition unit for acquiring, from the storage unit, selected information matching a selected string acquired from an information processing apparatus; and a transmission control unit for performing control such that the selected information acquired by the selected information acquisition unit is transmitted to the information processing apparatus.

(13) A history management method including:

storing, for each search string, one or more pieces of selected information selected from one or more pieces of page identification information obtained by using the search string;

acquiring, from the one or more pieces of page identification information, selected information matching a selected string acquired from an information processing apparatus; and performing control such that the selected information which has been acquired is transmitted to the information processing apparatus.

(14) An information processing system including:

a history management server including a storage unit storing, for each search string, one or more pieces of selected information selected from one or more pieces of page identification information obtained by using the search string, a selected information acquisition unit for acquiring, from the storage unit, selected information matching a selected string, and a transmission control unit for performing control such that the selected information acquired by the selected information acquisition unit is transmitted; and an information processing apparatus including a selected information acquisition unit for acquiring the selected information from the history management server, and a display control unit for performing control such that information regarding a page identified by the selected information acquired by the selected information acquisition unit is displayed.

The present disclosure contains subject matter related to that disclosed in Japanese Priority Patent Application JP 2011-084649 filed in the Japan Patent Office on Apr. 6, 2011, the entire content of which is hereby incorporated by reference.

What is claimed is:

1. An information processing apparatus comprising:

a selected information acquisition unit configured to acquire, from a history management server, selected information matching a selected string; and a display control unit configured to perform control such that information regarding each page of a plurality of pages identified by the selected information acquired by the selected information acquisition unit is displayed, wherein the history management server manages, for each search string of a plurality of search strings, one or more pieces of selected information selected from one or more pieces of page identification information obtained by using the respective search string, the one or more pieces of selected information including an image of each identified page, wherein the selected information acquisition unit acquires, as the selected information matching the selected string, the one or more pieces of selected information managed by the history management server which correlate with a search string of the plurality of search strings matching the selected string, wherein the management by the history management server of the one or more pieces of selected information for each search string constitutes a pre-mapping that correlates, prior to the acquiring of the selected information by the selected information acquisition unit, the one or more pieces of selected information including the image of each identified page as search results stored in an order according to a rank of each of the one of more pieces of information for respective ones of the plurality of search strings, and wherein the selected information acquisition unit and the display control unit are each implemented via at least one processor.

2. The information processing apparatus according to claim 1, further comprising:
a string selection unit configured to select a string included in a page as the selected string,
wherein the string selection unit is implemented via at least one processor.

3. The information processing apparatus according to claim 1,
wherein the history management server is further configured to manage a number of times of selection of each of the one or more pieces of selected information, and
wherein the selected information acquisition unit acquires selected information with a largest number of times of selection, determined among the one or more pieces of selected information.

4. The information processing apparatus according to claim 1,
wherein the history management server is further configured to manage an average stay time at a page identified by each of the one or more pieces of selected information, and
wherein the selected information acquisition unit acquires selected information with a longest average stay time, determined among the one or more pieces of selected information.

5. The information processing apparatus according to claim 1,
wherein the selected information acquisition unit acquires, together with the one or more pieces of selected information matching the selected string, the rank of each of the one or more pieces of information based on a number of times of selection of each of the one or more pieces of selected information, and
wherein the display control unit performs control such that information regarding each page identified by the one or more pieces of selected information acquired by the selected information acquisition unit is displayed in the stored order according to the rank of each of the one or more pieces of selected information.

6. The information processing apparatus according to claim 1,
wherein the selected information acquisition unit acquires, together with the one or more pieces of selected information matching the selected string, the rank of each of the one of more pieces of information based on an average stay time at a page identified by each of the one or more pieces of selected information, and
wherein the display control unit performs control such that information regarding each page identified by each of the one or more pieces of selected information acquired by the selected information acquisition unit is displayed in an order according to the rank of each of the one or more pieces of selected information.

7. The information processing apparatus according to claim 1,
wherein the selected information acquisition unit acquires, as the selected information, at least one URL that is related to a search string of the plurality of search strings that matches the selected string.

8. The information processing apparatus according to claim 7,
wherein the search string that is related to the at least one URL acquired as the selected information matches the selected string by being identical to the selected string.

9. The information processing apparatus according to claim 7,
wherein the search string that is related to the at least one URL acquired as the selected information matches the selected string by containing similar term or terms as the selected string.

10. The information processing apparatus according to claim 1,
wherein each search string of the plurality of search strings comprises a string of characters that is input by a user and used for searching to obtain the selected information from the history management server.

11. The information processing apparatus according to claim 1,
wherein the selected information acquisition unit initiates a search of the pre-mapped search strings that are managed by the history management server, to find a string of characters specified by the search string as input by a user.

12. An information processing method comprising:
acquiring, from a history management server, selected information matching a selected string; and
performing control such that information regarding each page of a plurality of pages identified by the selected information which have been acquired is displayed,
wherein the history management server manages, for each search string of a plurality of search strings, one or more pieces of selected information selected from one or more pieces of page identification information obtained by using the respective search string, the one or more pieces of selected information including an image of each identified page,
wherein the one or more pieces of selected information is managed by the history management server to be correlated with a search string of the plurality of search strings matching the selected string, and is acquired from the history management server as the selected information, and
wherein the management by the history management server of the one or more pieces of selected information for each search string constitutes a pre-mapping that correlates, prior to the acquiring of the selected information, the one or more pieces of selected information including the image of each identified page as search results stored in an order according to a rank of each of the one of more pieces of information for respective ones of the plurality of search strings.

13. A non-transitory computer-readable medium having embodied thereon a program, which when executed by a computer causes the computer to perform a method, the method comprising:
acquiring, from a history management server, selected information matching a selected string; and
performing control such that information regarding each page of a plurality of pages identified by the acquired selected information is displayed,
wherein the history management server manages, for each search string of a plurality of search strings, one or more pieces of selected information selected from one or more pieces of page identification information obtained by using the respective search string, the one or more pieces of selected information including an image of each identified page,
wherein the one or more pieces of selected information is managed by the history management server to be correlated with a search string of the plurality of search strings matching the selected string, and is acquired from the history management server as the selected information, and
wherein the management by the history management server of the one or more pieces of selected information for each search string constitutes a pre-mapping that correlates, prior to the acquiring of the selected information, the one or more pieces of selected information including the image of each identified page as search results stored in an order according to a rank of each of the one of more pieces of information for respective ones of the plurality of search strings.

14. An information processing apparatus comprising:
a page identification information acquisition unit for acquiring, from a search server, one or more pieces of page identification information matching a search string of a plurality of search strings;
a page selection unit for selecting page identification information from the one or more pieces of page identification information acquired by the page identification information acquisition unit regarding each page of a plurality of pages identified by the one or more pieces of page identification information; and
a transmission control unit for performing control such that the search string and the page identification information selected by the page selection unit are transmitted to a history management server, the one or more pieces of selected page identification information including an image of each identified page,
wherein the history management server manages, for each search string of the plurality of search strings, one or more pieces of selected page identification information by pre-mapping to correlate, prior to the acquiring of the page identification information, the one or more pieces of selected page identification information including the image of each identified page as search results stored in an order according to a rank of each of the one of more pieces of information for respective ones of the plurality of search strings, and
wherein the page identification information acquisition unit, the page selection unit, and the transmission control unit are each implemented via at least one processor.

15. An information processing method comprising:
acquiring, from a search server, one or more pieces of page identification information matching a search string of a plurality of search strings;
selecting page identification information from the one or more pieces of page identification information which have been acquired regarding each page of a plurality of pages identified by the one or more pieces of page identification information; and
performing control such that the search string and the page identification information are transmitted to a history management server, the one or more pieces of selected page identification information including an image of each identified page,
wherein the history management server manages, for each search string of the plurality of search strings, one or more pieces of selected page identification information by pre-mapping to correlate, prior to the acquiring of the page identification information, the one or more pieces of selected page identification information including the image of each identified page as search results stored in an order according to a rank of each of the one of more pieces of information for respective ones of the plurality of search strings.

16. A non-transitory computer-readable medium having embodied thereon a program, which when executed by a computer causes the computer to perform a method, the method comprising:
acquiring, from a search server, one or more pieces of page identification information matching a search string of a plurality of search strings;
selecting page identification information from the one or more pieces of acquired page identification information regarding each page of a plurality of pages identified by the one or more pieces of page identification information; and
performing control such that the search string and the one or more pieces of selected page identification information are transmitted to a history management server, the one or more pieces of selected page identification information including an image of each identified page,
wherein the history management server manages, for each search string of the plurality of search strings, one or more pieces of selected page identification information by pre-mapping to correlate, prior to the acquiring of the page identification information, the one or more pieces of selected information including the image of each identified page as search results stored in an order according to a rank of each of the one or more pieces of information for respective ones of the plurality of search strings.

17. A history management server comprising:
a storage unit storing, for each search string of a plurality of search strings, one or more pieces of selected information selected from one or more pieces of page identification information obtained by using the respective search string;
a selected information acquisition unit for acquiring, from the storage unit, the one or more pieces of selected information matching a selected string of the plurality of search strings acquired from an information processing apparatus regarding each page of a plurality of pages identified by the one or more pieces of selected information; and
a transmission control unit for performing control such that the one or more pieces of selected information acquired by the selected information acquisition unit are transmitted to the information processing apparatus, the one or more pieces of selected information including an image of each page identified by the page identification information, wherein the history management server manages, for each search string of the plurality of search strings, the one or more pieces of selected information by pre-mapping to correlate, prior to the acquisition of the selected string, the one or more pieces of selected information including the image of each identified page as search results stored in an order according to a rank of each of the one of more pieces of information for respective ones of the plurality of search strings, and wherein at least one of the storage unit, the selected information acquisition unit, and the transmission control unit is implemented via a processor.

18. A history management method comprising:

storing, for each search string of a plurality of search strings, one or more pieces of selected information selected from one or more pieces of page identification information obtained by using the respective search string;

acquiring, from the one or more pieces of page identification information, the one or more pieces of selected information matching a selected string of the plurality of search strings acquired from an information processing apparatus regarding each page of a plurality of pages identified by the one or more pieces of page identification information; and performing control such that the one or more pieces of selected information which have been acquired are transmitted to the information processing apparatus, the one or more pieces of selected information including an image of each page identified by the page identification information, wherein each search string of the plurality of search strings is managed such that the one or more pieces of selected information are pre-mapped, prior to the acquisition of the selected string, to be correlated including the image of each identified page as search results stored in an order according to a rank of each of the one of more pieces of information for respective ones of the plurality of search strings.

19. An information processing system comprising:

a history management server including
- a storage unit storing, for each search string of a plurality of search strings, one or more pieces of selected information selected from one or more pieces of page identification information obtained by using the respective search string,
- a selected information acquisition unit for acquiring, from the storage unit, the one or more pieces of selected information matching a selected string of the plurality of search strings regarding each page of a plurality of pages identified by the one or more pieces of selected information, and
- a transmission control unit for performing control such that the one or more pieces of selected information acquired by the selected information acquisition unit are transmitted, the one or more pieces of selected information including an image of each page identified by the page identification information,
- wherein the history management server manages, for each search string of the plurality of search strings, the one or more pieces of selected information by pre-mapping to correlate, prior to the acquisition of the selected string, the one or more pieces of selected information including the image of each identified page as search results stored in an order according to a rank of each of the one of more pieces of information for respective ones of the plurality of search strings, and
- wherein the selected information acquisition unit of the history management server and the transmission control unit are each implemented via at least one processor of the history management server; and an information processing apparatus including
- a selected information acquisition unit for acquiring the one or more pieces of selected information from the history management server, and
- a display control unit for performing control such that information regarding the page identified by the page identification information,
- wherein the selected information acquisition unit of the information processing apparatus and the display control unit are each implemented via at least one processor of the information processing apparatus.

* * * * *